(12) United States Patent
Weiss

(10) Patent No.: US 7,680,327 B2
(45) Date of Patent: Mar. 16, 2010

(54) METHOD AND APPARATUS FOR PROCESSING IMAGE DATA

(75) Inventor: Ben Weiss, Carpenteria, CA (US)

(73) Assignee: Shell & Slate Software, Inc., Carpenteria, CA (US)

( * ) Notice: Subject to any disclaimer, the term of this patent is extended or adjusted under 35 U.S.C. 154(b) by 1101 days.

(21) Appl. No.: 11/329,777

(22) Filed: Jan. 11, 2006

(65) Prior Publication Data

US 2006/0110063 A1    May 25, 2006

Related U.S. Application Data

(63) Continuation of application No. 10/127,985, filed on Apr. 22, 2002, now Pat. No. 7,010,163, application No. 11/329,777, and a continuation of application No. 10/127,906, filed on Apr. 22, 2002, now Pat. No. 6,996,287.

(60) Provisional application No. 60/285,415, filed on Apr. 20, 2001, provisional application No. 60/285,414, filed on Apr. 20, 2001.

(51) Int. Cl.
*G06K 9/00* (2006.01)
*G06K 9/40* (2006.01)
*H04N 5/14* (2006.01)

(52) U.S. Cl. ............ 382/168; 382/224; 382/262; 348/672; 358/522

(58) Field of Classification Search ......... 382/168–172, 382/224–228, 260–262; 348/671–672; 358/518–522; 702/179–180
See application file for complete search history.

(56) References Cited

U.S. PATENT DOCUMENTS 5,086,485 A * 2/1992 Lin .......................... 382/172
5,594,807 A * 1/1997 Liu .......................... 382/128

(Continued)

OTHER PUBLICATIONS

Anil N. Hirani, et al., Combining Frequency and Spatial Domain Information for Fast Interactive Image Noise Removal, 8pgs., Sony Corporation, Tokyo, Japan—printed Aug. 18, 2002.

(Continued)

*Primary Examiner*—Manav Seth
(74) *Attorney, Agent, or Firm*—The Hecker Law Group, PLC

(57) ABSTRACT

The invention is a method and apparatus for improving image-processing applications. Embodiments of the invention provide methods for preserving computation results and offer intermediary computation steps to allow the processing of images at any location to take advantage of previously processed image areas. The preferred embodiment offers a method for building a median filter that significantly improves the processing speed over basic techniques. By building a histogram hierarchy, image data statistics are added and subtracted using a multiplicity of histograms from the histogram hierarchy, where each histogram describes an image area. Furthermore, a histogram hierarchy is built using multiple layers, each layer defining a level of statistical resolution.

11 Claims, 9 Drawing Sheets

U.S. PATENT DOCUMENTS

| | | | | |
|---|---|---|---|---|
| 5,751,848 | A | * | 5/1998 | Farrell .................. 382/172 |
| 5,835,628 | A | * | 11/1998 | Farrell .................. 382/168 |
| 5,848,183 | A | * | 12/1998 | Farrell .................. 382/172 |
| 5,872,867 | A | * | 2/1999 | Bergen .................. 382/254 |
| 5,881,166 | A | * | 3/1999 | Farrell .................. 382/168 |
| 6,148,103 | A | * | 11/2000 | Nenonen ................ 382/169 |
| 6,252,983 | B1 | | 6/2001 | Takeshima et al. ......... 382/168 |
| 6,373,533 | B1 | * | 4/2002 | Kawabata et al. .......... 348/672 |
| 6,449,390 | B1 | | 9/2002 | Inoue .................. 382/168 |
| 6,597,738 | B1 | | 7/2003 | Park et al. ............. 375/240.16 |
| 6,647,141 | B1 | | 11/2003 | Li .................... 382/162 |
| 6,674,444 | B1 | | 1/2004 | Tahara ................. 345/589 |
| 6,731,820 | B2 | * | 5/2004 | Otsuka ................. 382/262 |
| 6,771,814 | B1 | | 8/2004 | Nakajima ............... 382/168 |
| 6,839,462 | B1 | | 1/2005 | Kitney et al. ............ 382/173 |

OTHER PUBLICATIONS

Homan Igehy, et al., Image Replacement Through Texture Synthesis, 4pgs., Stanford University, printed Aug. 18, 2002.

Marcelo Bertalmio et al., Image Inpainting, 8pgs., University of Minnesota, Universitat Pompeu Fabra, printed Aug. 18, 2002.

Manuel M. Oliveira et al., Fast Digital Image Impainting, Proceedings of the International Conference on Visualization (VIIP 2001), Marbella, Spain, Sep. 3-5, 2001, pp. 261-266.

Kai's Photo Soap, Explorer Guide, Version 1.0 MetaTools, Inc. 1997 (e.g., "Detail Room," "Cloning" p. 31.).

Kai's Photo Soap, Clean Up Your Image, CD 1997, MetaTools, Inc. (e.g., "detailRooom" panel; "Clone" button; click center icon (grey face), click once on main image to zoom to 1:1 resolution, click small white target on image and drag to desired source location for testure-cloning, then click and drag on the image in a separate location, and the high-frequency texture will be transferred from the target location to the clicked loion.) (See CD enclosed with IDS filed Aug. 19, 2002 for application U.S. Appl. No. 10/127,906.

Anil N. Hirani, et al., Combining Frequency and Spatial Domain Information for Fast Interactive Image Noise Removal, 8 pgs., Sony Corporation, Tokyo, Japan.

Homan Igehy, et al., Image Replacement Through Texture Synthesis, 4 pgs., Stanford University.

Marcelo Bertalmio, et al., Image Inpainting, 8 pgs., University of Minnesota, Universitat Pompeu Fabra.

Proceedings of the International Conference on Visualization, Image and Image Processing (VIIP 2001), Marbella, Spain. Sep. 3-5, 2001, pp. 261-266.

Kai's Photo Soap, Explorer Guide, Version 1.0, MetaTools, Inc. 1997 (e.g., "Detail Room" "Cloning" p. 31.).

Kai's Photo Soap, Clean Up Your Image, CD, 1997, MetaTools, Inc. (e.g., "Detail Room" panel; "Clone" button; click center icon (grey face), click once on main image to zoom to 1:1 resolution, click small white target on image and drag to desired source location for testure-cloning, then click and drag on the image in a seperate location, and the high-frequency texture will be transferred from the target location to the clicked loion.) (see CD enclosed w/ IDS filed Aug. 19, 2002 for U.S. Appl. No. 10/127,906).

* cited by examiner

METHOD AND APPARATUS FOR PROCESSING IMAGE DATA

CROSS-REFERENCES TO RELATED APPLICATIONS

This application is a continuation of U.S. patent application Ser. No. 10/127,985, filed Apr. 22, 2002, which claims the benefit of U.S. Provisional Application No. 60/285,415, filed Apr. 20, 2001, U.S. Provisional Application No. 60/285,414, filed Apr. 20, 2001, and co-pending U.S. patent application Ser. No. 10/127,906, filed Apr. 22, 2002, the specifications of each of which are herein incorporated by reference in their entirety.

FIELD OF THE INVENTION

This invention relates to the field of computer technology. More specifically, the invention relates to a method and apparatus for improving image data processing.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

Digital image manipulation is an integral part of the production process in many industries. For example, graphic artists, computer animators, scientists and many other computer users frequently utilize various tools for performing digital image manipulation. Such users have access to a variety of image processing tools. Each image-processing tool utilizes one or more image processing techniques to achieve a specific goal, although, to accomplish any given image-processing task, users are frequently required to combine a number of different image processing tools.

Most image processing techniques require a substantial amount of computing power. Whether image-processing techniques are used interactively or automatically, the computation time required to complete a task may hinder the task itself, especially when the amount of data to be processed is very large.

One way to speed up image processing is to increase the hardware performance by implementing faster electronic chips and/or scaling up the number of processors running the task. However, this solution can be prohibitively expensive. Another way of increasing the processing speed is to utilize alternative and faster processing methods that produce the same results as the existing ones. This is typically accomplished by improving the execution time of the underlying algorithm associated with the image processing technique that is being performed.

An example of an image processing technique, that is computationally intensive, is referred to by those of ordinary skill in the art as a median filter. In the image processing field median filters provide a mechanism for processing an image in such a way that each resulting value equals the numerical median of the source values within a given radius. A problem most users encounter is that existing median filters take prohibitively long to process an image. The slow processing speed is a result of inefficiencies in the underlying algorithm. Therefore, there is a need to improve processing speeds by eliminating these inefficiencies. As is discussed in more detail below, embodiments of the invention provide a technique for increasing the speed of image processing algorithms, such as the median filter, through the use of a more efficient processing methodology.

SUMMARY OF THE INVENTION

Figure 1:
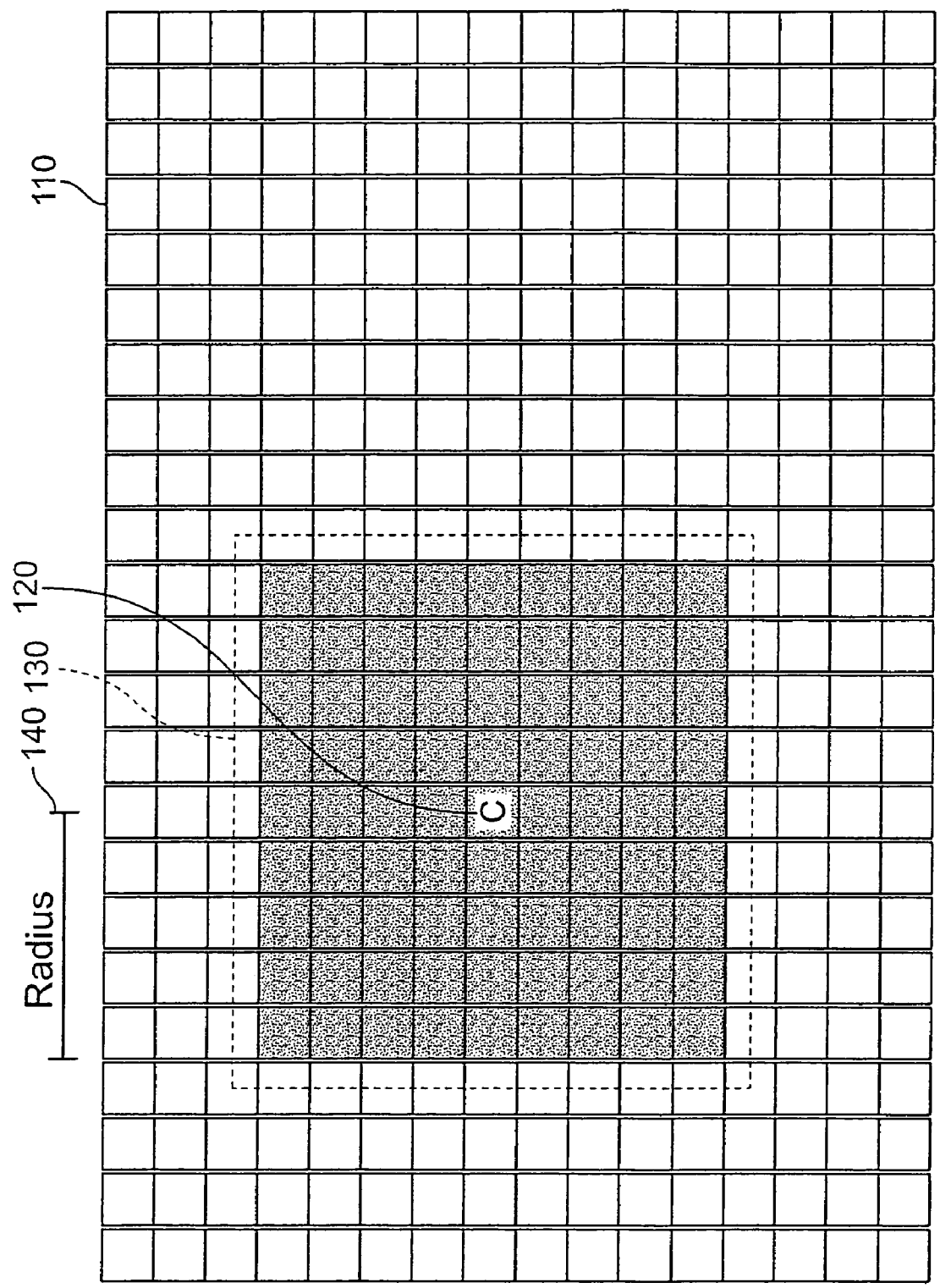
FIG. 1 illustrates an image undergoing the process of filtering where a pixel "C" at the center of an area having a radius "r" is processed in accordance with embodiments of the invention.

The invention described herein relates to a method and apparatus for processing image data. More specifically, an aspect of the invention provides a mechanism for improving the execution time of a median filter. However, embodiments of the invention can be used to enhance the speed of any image processing technique that repeatedly accesses image data to perform one or more types of computations.

Embodiments of the invention perform an image processing technique by constructing one or more sets of histogram hierarchies, each of which have one or more layers. Intermediate processing steps use the histogram hierarchy to store the results of the intermediate computation. Advancing the computation from one image location to another involves updating the histogram hierarchies, by removing data associated with a non-overlapping area from the previous image location, and adding data associated with a non-overlapping area in the current location. By preserving the processing results of the overlapping areas, common to both previous and current locations, the invention provides for more efficient memory usage and a shorter processing time.

As an example, applications providing median filters may implement an embodiment of the invention to process image data. In one median filter implementation, a histogram hierarchy is constructed using two layers that reflect two levels of numerical resolution. A median filter typically allocates to each pixel a value equal to the numerical 50th percentile of all the pixels in a surrounding area. According to the basic median filter technique, to select the 50$^{th}$ percentile, the values of all the pixels within the area surrounding a pixel are sorted and counted. The 50$^{th}$ percentile's value is found by counting one half of the total number of pixels. The median value is selected at one half of the count. The time required for application of this technique is usually reduced by constructing a histogram, which shortens the counting process. In embodiments of the invention, several layers of histograms may be built. The relationship between classes in different layers is such that each class in one layer may map to a range of classes in a different layer. During the counting (or search) process, coarse (low numerical resolution) layers are processed first and then the counting proceeds into finer (higher numerical resolution) histogram layers.

Embodiments of the invention preserve the data of the overlapping area in a histogram while moving the computation from one image location to another. Other embodiments of the invention may implement multiple levels of histograms hierarchies, allowing for computation of multiple image locations in parallel.

DETAILED DESCRIPTION

A method and apparatus for image processing is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

In the field of image manipulation, any program or a device having the ability to transform an image is referred to as a filter. For example, a filter may refer to a ventricular element, such as a camera lens that applies one or more physical transformations to the properties of light traversing the element. The term filter may also refer to a software or hardware implementation of a methodology for transforming image data. In the latter case, the term, "digital filter", is used to refer to the software or device. Some digital filters are intended to digitally reproduce some well-known characteristics of physical filters (e.g., light dimming, blurring effects, etc.), while others do not have a physical equivalent (e.g., a median filter).

Digital filters typically change the appearance of an image by manipulating the image pixels in accordance with a set of general properties (e.g., color palettes) or a topology. For example, in what is referred to as a Gaussian filter, the filter implements a method where each pixel, at a given location in the output image, is generated through the combination of pixels in that location in the input image and the pixels surrounding that location. Each of surrounding pixels is weighted according to a Gaussian distribution.

Embodiments of the invention may be implemented in any data processing technique where one or more pixels in an image are involved in an iterative or recursive computational process. For example, an embodiment of the invention allows a filter that performs computation on image areas to further utilize the computation results produced for a given pixel, within one area, in the computation of an overlapping image area, thereby reducing the overall computation time. This processing technique reduces the amount of computation time required to process the image data.

For the purpose of clarity, embodiments of the invention using a median filter, are described to illustrate different aspects of the invention. The median of a population is a statistical parameter describing the value of the element at about the fiftieth percentile. In the context of image data processing, a median filter refers to selecting the pixel value of the fiftieth percentile of pixels within an image area. However, the reader should note that a median filter is only one example of the implementation of this invention and that other filter or image processing techniques may also benefit from using one or more aspects of this invention. It will be apparent, however, to one skilled in the art, that the present invention may be practiced in many different embodiments implementing other types of statistics to provide image-processing capabilities.

Median Filter

Median filters are a category of filters that describe the process of allocating to each pixel, in the output image, the value of the median of the input image in the area surrounding the pixel in question. FIG. 1 illustrates an image 110 undergoing the process of filtering where a pixel "C" (e.g., 120) is processed at the center of an area 130. The filter area is typically a square characterized by its half-side 140 (the square side being equal to 2*r+1), or a circle characterized by its radius. To apply a median filter of a square area with a half-side, r, to produce a filtered image, for each pixel location, the process examines the pixels within a surrounding box, and chooses the median value of those pixels to be the output for that location. The basic approach for computing the median for an area utilizes a "brute-force" algorithm that solves the problem in a straightforward way. Embodiments of the invention may use the basic approach; however, in the descriptions below embodiments add refinements to optimize the computation time. According to the "brute force" algorithm, for each pixel, the process makes a list of all neighboring pixels within the filtering area, as shown in FIG. 1. A process embodying the invention sorts the list according to a numerical order, then selects the median to become the output value at that location. The running time of the "brute force" algorithm is equal to $r^2 \log r$ per pixel. The running time is a linear function of the value of the dimension of the square, r, and becomes very inefficient with large "r".

Data Structures

Figure 4:
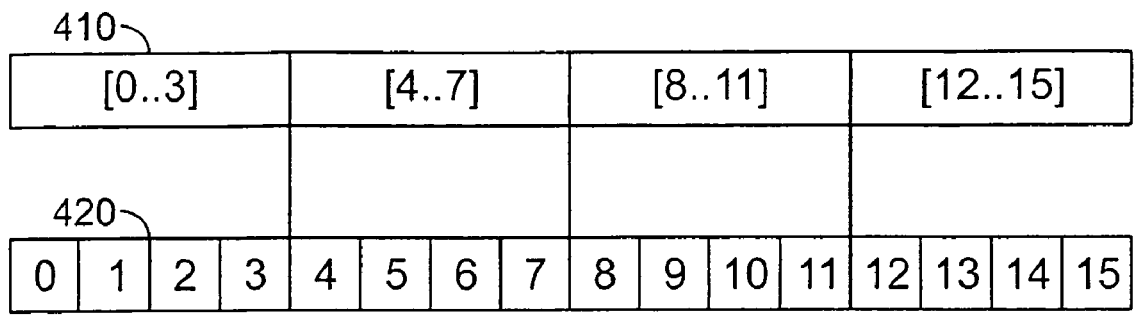
FIG. 4 illustrates a Multi-Resolution Histogram comprising a first array with a four-element "low-resolution" histogram, and a second array with a 16-element "high-resolution" histogram, used in embodiments of the invention.

The term "Multi-Resolution Histogram" (FIG. 4) is defined as a plurality of histograms, from which values in a specific range are added or removed in concert. Each histogram represents the entire range of values, but with different numerical resolution. At least one of the histograms must represent the full range of values in a 1:1 correspondence (i.e., one bucket per possible value). FIG. 4 depicts a two-level Multi-Resolution Histogram, capable of storing integer values in the range [0 . . . 15], with a 16-bucket full-resolution histogram and a 4-bucket low-resolution histogram. The practical computational advantage of using a Multi-Resolution Histogram (as opposed to a simple histogram) is that it can dramatically increase the efficiency of extracting certain rank-order properties from the contained set of values.

The term 'Assimilator' used in accordance with one embodiment of the invention is defined as any data structure capable of performing the following operations or an equivalent thereof:

(1) Numerical values in a specified range may be added to and removed from the structure at any time. (e.g., add '7', remove '28', etc.)

(2) Certain rank-order properties of the set of contained values (e.g. median, minimum, maximum, nth percentile) may be extracted from the data structure at any time.

(3) The rank-order properties may be extracted at any time from a plurality of Assimilators at once. (E.g., given three Assimilators, for instance, it is possible to extract the median of the set of values contained by all three structures combined.) Note that this is a different operation from extracting the median value from each Assimilator individually.

A partial list of data structures which may meet the criteria of an Assimilator: Histograms, Multi-Resolution Histograms, balanced heaps, or hash tables. However, the invention contemplates the use of other types of data structures that fit the criteria stated above and the full scope of any equivalents.

In an embodiment of the invention, the Assimilators used are Multi-Resolution Histograms. Some examples of such use follows. For 8-bit image data, the Multi-Resolution Histograms includes two histograms of 16 and 256 elements, respectively. For 15-bit image data, the Multi-Resolution Histograms preferentially includes three histograms of 32, 1024, and 32768 elements, respectively.

Overlapping Regions

Figure 2:
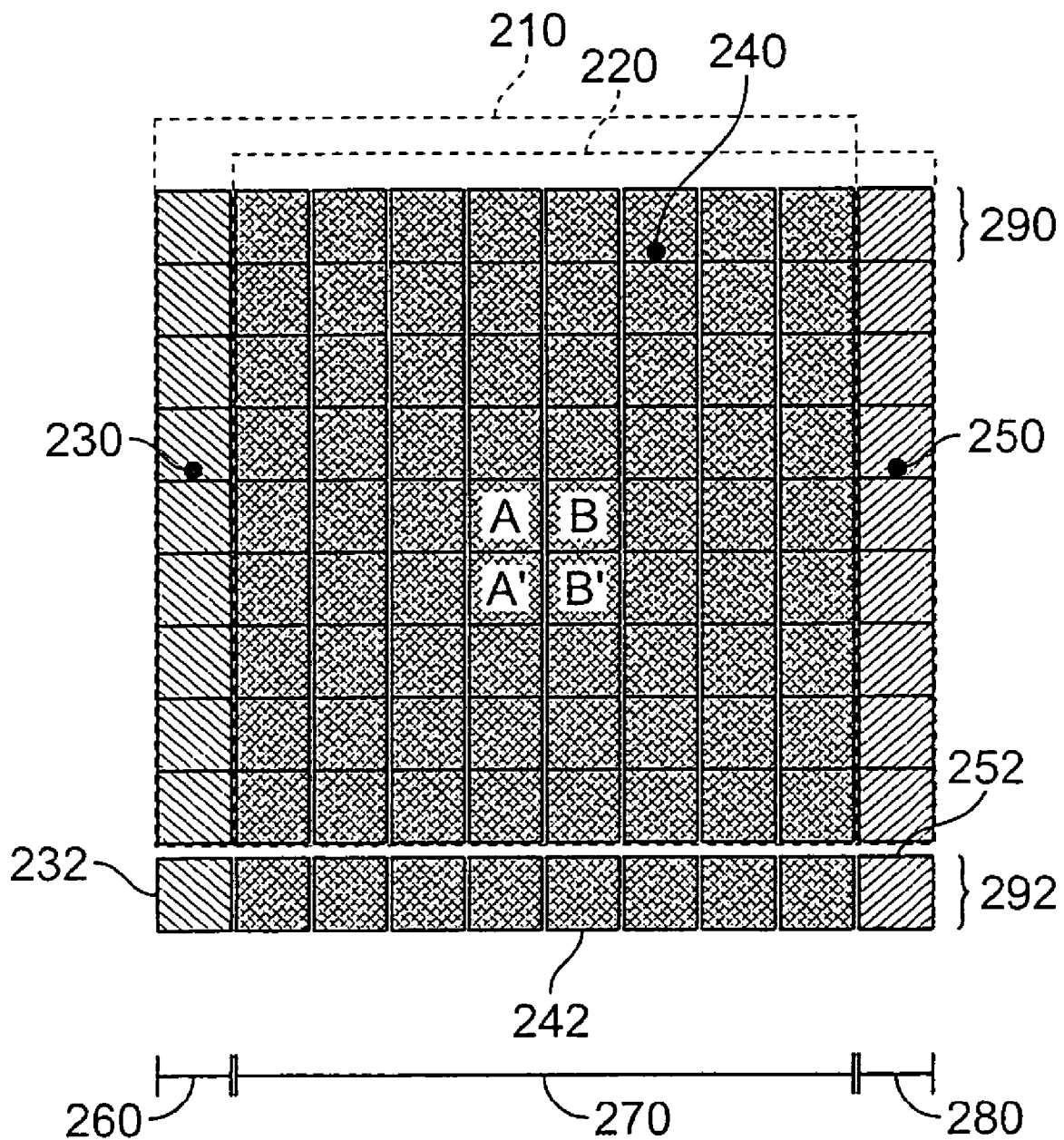
FIG. 2 illustrates two overlapping regions used in processing two neighboring pixels in embodiments of the invention

FIG. 2 illustrates two overlapping regions used in processing two neighboring pixels in embodiments of the invention. The two image regions 210 and 220 are centered on pixel A and pixel B, respectively. Filters, implementing one or more embodiments of the invention, optimize the amount of computation necessary to process a given pixel, while utilizing the computation already performed for a neighboring pixel. For example, in FIG. 2 the computation performed for area 210 for pixel A, is substantially utilized during the computation performed for area 210 to generate pixel 220. In accordance with the invention, a filter will observe that, for neighboring pixels, the surrounding areas largely overlap. In FIG. 2, area 210 overlaps with area 220 over area 240. Area 230, in this example, is part of area 210, while area 250 is part of area 220. In accordance with embodiments of the invention, while processing area 220 for pixel "A" the system preserves the computation results, and reuses the results to process area 220 for pixel "B". It is clear from this schematic representation that all or part of the data originating from computing area 210 can be preserved as a sub-area 240.

In the illustration presented in FIG. 2, embodiments of the invention may use three (3) Assimilators, 260, 270 and 280, holding the data for areas 230, 240 and 250, respectively. Once Assimilators 260, 270 and 280 are computed, embodiments of the invention may process joint data from Assimilators 260 and 270 simultaneously to obtain the desired result for area 210. Where histograms or Multi-Resolution Histograms are utilized as Assimilators, the additive property of histograms is used to extract the numerical median of the combined values in Assimilators 260 and 270. The histogram processing is interrupted when a median value is found, resulting in a reduction of processing steps compared to a two-step process where the entire histograms constituting the Assimilators are added, then the numerical median is computed. Similarly, to compute a histogram for area 220, embodiments of the invention may extract the median from combined Assimilators 270 and 280.

Embodiments of the invention carry out processing from one row to the next (or from one column to the next), while keeping data from overlapping areas in an Assimilator. In the example illustrated in FIG. 2, embodiments of the invention remove row data 290 from corresponding Assimilators and add row data 292 to the Assimilators. Adding row 292 includes adding pixel areas 232, 242 and 252 to Assimilators 260, 270 and 280 respectively. By jointly processing Assimilator 260 and 270, a new pixel output (e.g.,. A') can be computed, and by jointly processing Assimilator 270 and 280, a neighboring output pixel (e.g., B') can be computed. To process an entire image, embodiments of the invention may iteratively subtract top row data from the Assimilators and add a bottom row to the Assimilators to compute one or more output pixels. Multiple pixels maybe computed at each interaction.

Eight-fold Filtering Method

Figure 3:
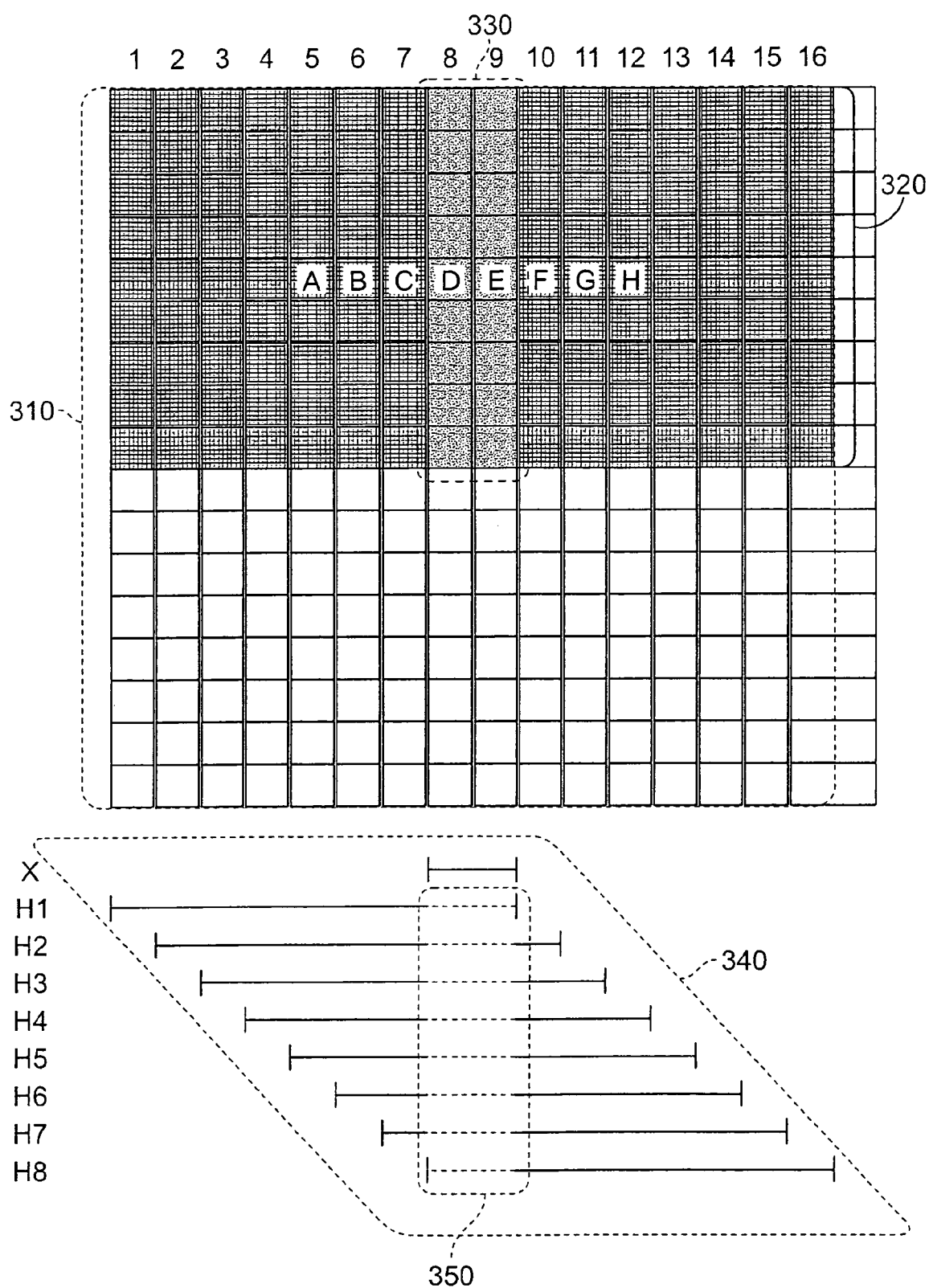
FIG. 3 illustrates a multiplexing image processing technique using a 2-level hierarchy of Assimilators in accordance with an embodiment of the invention.

FIG. 3 illustrates a multiplexing image processing technique using an 8-fold parallel approach in accordance with an embodiment of the invention. In this approach, the image 310 is processed in vertical strips. In an embodiment of the invention, an entire source area 320 is processed in parallel. For this purpose nine (9) Assimilators 340 are constructed; a "central" Assimilator "X", containing region 340 shared by all of regions centered on pixels "A" through "H", and eight "satellite" Assimilators (e.g., H1 though H8), containing the additional regions required by the "A" through "H" pixels individually. The bars in 340 refer to the width of the area covered by each Assimilator.

Each of the H1 through H8 Assimilators cover an area surrounding pixels A through H, respectively. However, embodiments of the invention may use Assimilator "X" in combination with each of the Assimilators H1 through H8, thus saving computation time by skipping the repetitive process of adding area 330 to each one of the Assimilators Hi through H8. Box 350 indicates the zone where computation is conducted using Assimilator "X".

Embodiments of the invention produce eight (8) pixels of output at each step. After each row is processed, the processing steps down one row and updates the histograms.

Memory Interleaving

In embodiments of the invention, the satellite Assimilators overlap and some pixels must be included in several Assimilators at each iteration. For example, pixels in column 14 must be included in satellite histograms H6, H7, and H8. Embodiments of the invention where histograms or Multi-Resolution Histograms are employed as Assimilators provide a method for further optimization of the computation by efficiently utilizing the vector-processing capabilities of modem processors. The histogram elements are also referred to as "buckets." To update multiple histogram buckets at once, embodiments of the invention construct the in-memory image of the histogram buckets in such a manner that corresponding buckets, from multiple histograms, are laid out contiguously for loading and processing data using the vector-processing capabilities of computer central processor units. Embodiments of the invention may interleave the histograms in memory corresponding to the satellite Assimilators. For example, bucket #7 for histogram H1 will be directly followed in memory by bucket #7 for histograms H2 through H8. As a result, to add a pixel value '7' to histograms H6, H7, and H8, addition is started at the address of bucket #7 of histogram H6 and continues over 3 contiguous addresses that correspond to buckets "7" for H7 and H8.

For example, in an embodiment of the invention that employs histograms or Multi-Resolution Histograms as Assimilators, the buckets used in the histograms are 16 bits in size. In current vector processing units (e.g., Altivec, present in the PowerPC chips), which use 128-bit vectors, eight buckets fit in a single processing unit. In a preferred embodiment of the invention, the action of modifying any subset of histograms H1 through H8 for any particular value, can be accomplished using a single vector-based load-modify-store operation. For non-vector processors, a serial 32-bit operation, may be used, which still increases the efficiency two-fold over accessing the 16-bit buckets individually. In other CPU implementations, such as the 64-bit MMX processing unit on Pentium chips, the interleaved layout of the data, implemented by embodiments of the invention, provides a significant performance gain. The invention contemplates providing a method to dynamically adapt the histograms' interleaving scheme to optimally use the vector capabilities of any given central processing unit.

Multi-Resolution Histograms

The invention provides a method that improves the process of determining a statistical parameter. For example, embodiments of the invention provide a method for improving on the brute-force sorting approach by using Multi-Resolution Histograms. A set of arrays is utilized to keep track of a whole region of pixels at once.

In a preferred embodiment of the invention, the Multi-Resolution Histogram utilizes memory arrays to represent data. It will be apparent, however, to one skilled in the art, that the present invention may be implemented using other methods for storing data, such as hash tables and balanced heaps or any data structure capable of storing data.

FIG. 4 illustrates a simple Multi-Resolution Histogram used in embodiments of the invention. The Multi-Resolution Histogram comprises a first array 410 with a four-element "low-resolution" histogram, and a second array with a 16-element "high-resolution" histogram 420, where each element tracks the number of occurrences of the corresponding pixel values in a region. The histogram elements are also referred to as "buckets." Each bucket keeps track of how many pixel values, in a region, fall within the corresponding range. For example, the bucket labeled "[4 . . . 7]" keeps a running count of how many pixels in the region have values between 4 and 7 inclusive. It is worthwhile to note that while, in the context of histograms, the term "resolution" may refer to the numerical resolution, other uses of the term "resolution" also describe the pixel density, or the number of pixel per surface area. For example, a pixel represented by a 16-bit value is said to have a higher numerical resolution than one that has an 8-bit representation.

Many computer images use 8-bit data, with pixel values ranging from 0 to 255. Embodiment of the invention may use two histogram layers: a 16-bucket "low-resolution" array, and a 256-bucket "high-resolution" array, analogous to the structure shown in FIG. 4. The high-resolution array maps directly to pixel values [0] . . . [255] and the low-resolution array maps to a wider ranges of values: [0 . . . 15], [16 . . . 31], . . . , [240 . . . 255]. Other embodiments of the invention may use any number of resolutions, translating into more than two arrays for holding pixel information, and any number of buckets per array. At least one of the arrays is full-resolution, with a 1:1 correspondence between buckets and the range of values represented. The number of buckets, as well as the range represented by each bucket, may be modified to suit the computation and the statistical method in use. Choosing the size of the classes (also referred to as bins) is sometimes referred to as binning. The binning process refers to the steps taken to determine the number of buckets and their distribution to construct a histogram. For example, embodiments of the invention may utilize a histogram that represents a range of 0 through 255 pixel values, or may construct a histogram that only represents the values contained within the range of values in a given area. In the latter case, embodiments of the invention may find the minimum and the maximum values and construct a histogram with a set of bucket to represent the optimal numerical resolution, or an optimal number of buckets to hold the data.

Embodiments of the invention may allow for a dynamic method for choosing an optimal representation of number and size of the buckets. Other embodiments may allow user input to be employed to define the size and number of the buckets, and employ user input in combination with a dynamic approach to compute an optimal size and number of buckets.

To add a pixel to a Multi-Resolution Histogram, the process may simply comprise adding "1" to the corresponding buckets in each array. For instance, to add the value '27', the process increments the high-resolution bucket corresponding to [27] and increment the low-resolution bucket corresponding to [16 . . . 31]. To remove a pixel value from the Multi-Resolution Histogram, the process subtracts 1 from the corresponding buckets. In a median filter situation the count of "1" is suitable in most cases; however, it is apparent to one skilled in the art that the method can be used with numbers other than "1" as, for example, with weighted numbers.

Once the appropriate pixels have been added, embodiments of the invention extract the median value. For example, suppose nine pixels are added to the Multi-Resolution Histogram (described above). Embodiments of the invention need to find the fifth of those nine values, which defines the median. The search for the median starts by summing the size of each bucket starting from either end of the low-resolution array. When the sum of exceeds the fifth value, the bucket that contains the fifth value has been found. The search is then conducted in the high-resolution array starting from the corresponding bucket found in the first search. For example, if the first bucket in the low-resolution array (corresponding to the range [0 . . . 15]) has a count of '4' and the second bucket (corresponding to [16 . . . 31]) has a count of '2', then the fifth ranked value overall must be in the range [16 . . . 31]. Embodiments of the invention search the high-resolution array from buckets 16 through 31 to find the precise median value.

Figure 5:
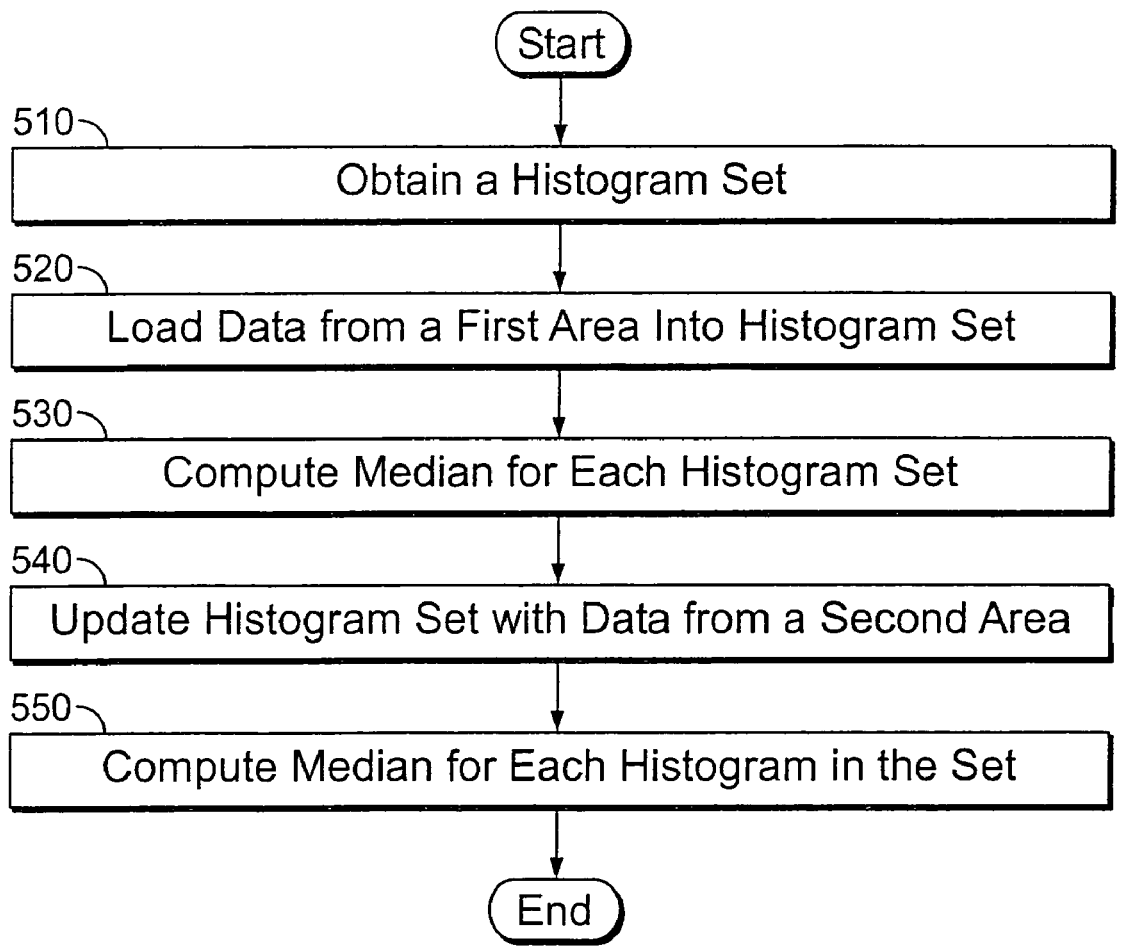
FIG. 5 illustrates steps involved in computing the median of two overlapping image regions in accordance with an embodiment of the invention.

FIG. 5 illustrates steps involved in computing the median of two overlapping image regions in accordance with embodiments of the invention. Embodiments of the invention obtain a set of Assimilators to hold the computation data for one or more image regions at step 510. Each Assimilator holds the computation data for a particular region. Any particular region may define an area surrounding a pixel, or a part of an area surrounding a pixel. As described above, one or more Assimilators are typically used to hold data for areas that are shared by two or more regions. Assimilators representing shared areas may be referred to as intermediate Assimilators. Intermediate Assimilators are computed once and used during the computation of other Assimilators in a set. Embodiments of the invention implement the Multi-Resolution Histogram structure described above. Embodiments of the invention may use a two-layer Multi-Resolution Histogram for each Assimilator.

At step 520, an embodiment of the invention loads the data from a first area. Step 520 may involve applying a statistical process to the data. An example of a statistical process is computing the frequency of occurrence of a given value with an exact match or within a range of values. The satellite Assimilators (e.g., Assimilators H1 through H8) in a hierarchy of Assimilators are computed simultaneously.

In embodiments of the invention designed to compute a median filter, the median of each area surrounding a particular pixel is computed using a set of Assimilators at step 530. Each set of Assimilators comprises one of the satellite Assimilators, in conjunction with one or more intermediate Assimilators. For example, in the 32-way case, three Assimilators are used per area, one from each level of the hierarchy: intermediate, satellite, and sub-satellite. The median computation, typically, involves searching for the value of the fiftieth ($50^{th}$) percentile in an area. Embodiments of the invention allow median filters to choose any other percentile other than the fiftieth ($50^{th}$).

Embodiments of the invention use a particular search technique that takes advantage of the Multi-Resolution Histogram described above. The search for the median, typically starts at one end of the histogram with the lowest resolution. In other embodiments of the invention the search may start at a location that was previously stored to indicate the location of the previous median value. A histogram is traversed and the size of each bucket is counted. When the count exceeds the total count, then embodiments of the invention advance to the corresponding layer with a higher resolution in the Multi-Resolution Histogram. This process continues until a value within the histogram with the highest resolution is found.

At step 540, embodiments of the invention update the hierarchy of Assimilators by removing data representing the non-overlapping areas surrounding a first pixel and adding data form a non-overlapping portion of an area surrounding a second pixel. For example, as illustrated in FIG. 3, a computation is conducted for eight (8) pixels at a time. Embodiments of the invention may process an image in vertical strips (or columns). In this case, the processing is advanced by moving one row downward at a time. However, other embodiments of the invention may elect to process images in horizontal strips; during horizontal processing, processing would proceed by advancing sideways (to the right or to the left, or any other chosen direction).

When vertical strip processing is chosen, non-overlapping areas from a previously processed area are located at the top, and a new non-overlapping area is located at the bottom of the processing area. Updating a hierarchy of Assimilators preferably comprises updating the intermediate Assimilators first, followed by the satellite Assimilators associated with areas surrounding the output pixels.

At step 550, the median for the region corresponding to each output pixel is computed in a process similar to step 520. The output is a set of pixels, each having a median value of a corresponding set of Assimilators in the hierarchy.

A process implementing the invention may step down one row in the image, adding the new row below and subtracting the old row above, and immediately extracting the medians for multiple pixels (e.g., eight pixels or more). The technique of conducting computation for multiple pixel columns in parallel is referred to, below, as multiplexing.

Embodiments of the invention generalize the multiplexing technique to filter arbitrarily many columns at once. In the preferred implementation, the computational complexity for both reading and writing to the Assimilators converges to a value, per pixel, represented by logarithm of "r", where "r" is the spanning distance of the filtering area surrounding the pixel in question. In an embodiment of the invention, specific implementations for 8-fold and 32-fold multiplexing are sufficient to exploit the utility of the new algorithm across the range of median filtering encountered in most common image processing applications. Typically, a radius between 1 and 100 pixels is sufficient.

Massively Parallel Processing

Figure 6:
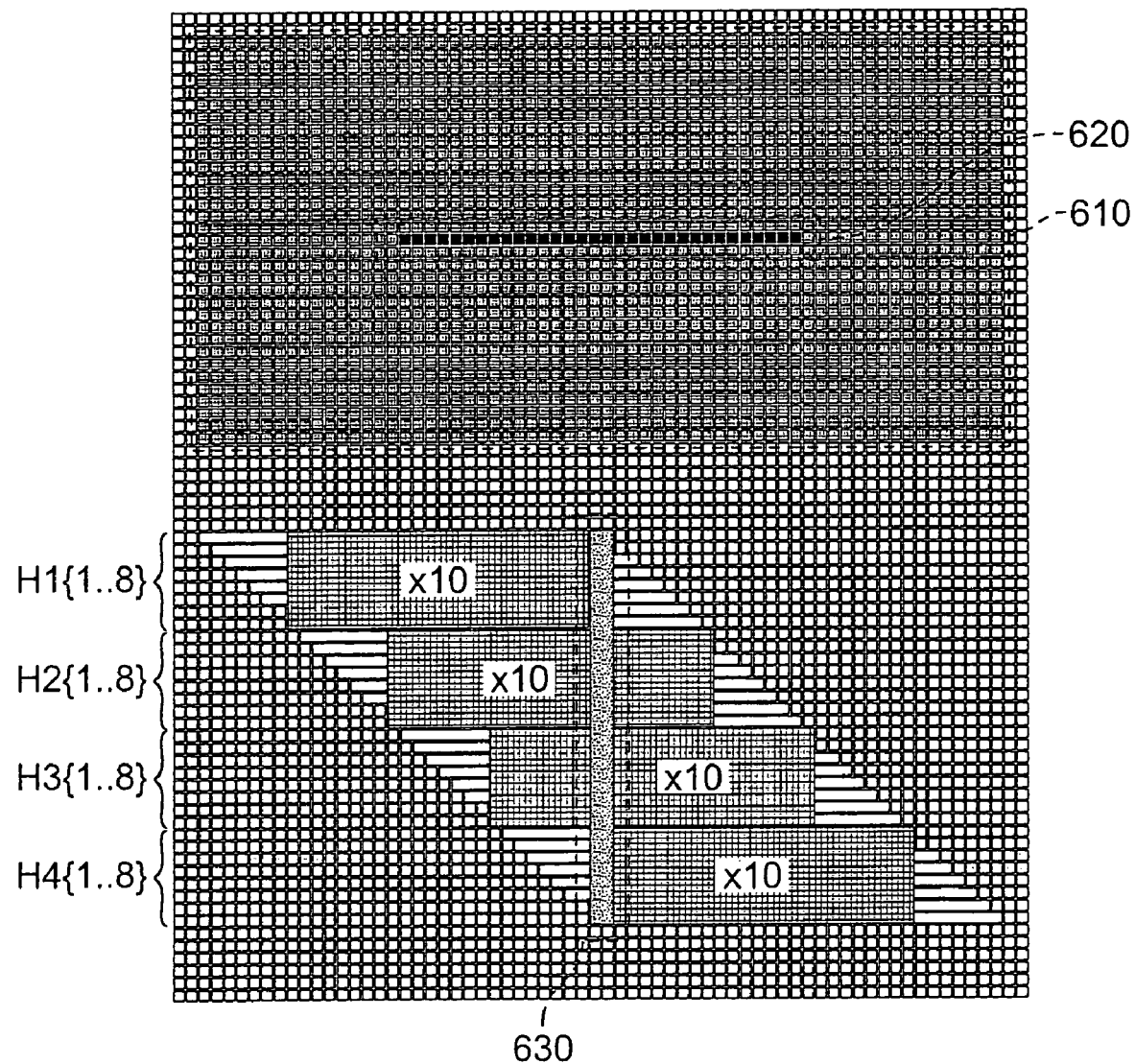
FIG. 6 illustrates a technique for carrying a 32-way image processing using a 3-level hierarchy of Assimilators in accordance with an embodiment of the invention.

FIG. 6 illustrates a technique for 32-way image processing in accordance with an embodiment of the invention. In FIG. 6, area 610 is being processed. In the 32-way processing technique, an embodiment of the invention processes 32 pixels at a time, which requires a spanning distance of the area such as a median-filter radius of at least 16. To accomplish a 32-way processing, an embodiment of the invention uses a three-level hierarchy of Assimilators: a central Assimilator 630, representing the common pixels 620 central to all filtering areas within 610, four (4) "satellite" Assimilators (e.g., H1 through H4), and 32 "sub-satellite" Assimilators.

Each of the 32 pixels corresponds to a set of Assimilators. Each set contains the central Assimilator, one of the four satellite Assimilators, and one of the 32 sub-satellite Assimilators (which may be represent a discontiguous region of pixels in the image). For each column in step 620 region at the top, step 630 traces downward to find which Assimilators contain pixels from that column.

In embodiments of the invention, as the median span increases, the central Assimilator region grows horizontally, and the satellite Assimilators shift away from the center. Otherwise, the technique stays the same. Embodiments of the invention may be adapted to process image data with any size of radii including large ones.

In accordance with implementations of the invention, each pixel is assigned the median of multiple Assimilators; one from each level of the hierarchy (intermediate, satellite, sub-satellite, etc.). Multiple Assimilators are searched in parallel. In the case where the Assimilators are implemented using histograms or Multi-Resolution Histograms, the component histograms are searched in parallel. For instance, to search histograms A and B simultaneously, a virtual histogram C is considered, where the 17th bucket of C contains the virtual value of the sum of the 17th bucket of A and 17th bucket of B. Thus, extracting the median from virtual histogram C is equivalent to finding the joint median of all the elements of histograms A and B together.

High-Precision Images

The specifications given above involve processing 8-bit image data. The invention provides means to also process so-called "deep" images: images represented by up to (or more than) 16 bits per channel. For example, in one application (Adobe Photoshop™), 15-bit images are the standard for high-precision imaging. The following describes how embodiments of the invention may be adapted to process high precision images.

For example, embodiments of the invention may comprise one major change to support 15-bit images. Each Multi-Resolution Histogram may comprise three arrays, rather than two (as described above). Each of the arrays may consist of a 32-element "low-resolution" array, a 1,024-element "mid-resolution" array, and a 32,768-element "high-resolution" array, corresponding to the total number of allowable pixel values. The rest of the algorithm remains the same. This adjustment obviously creates a larger memory footprint, but remains well within the range of feasibility. In the case of the 32-way multiplexed median operating on 15-bit images, the Multi-Resolution Histograms have a combined footprint of just over one megabyte.

The invention provides means to significantly reduce the memory footprint for most 15-bit images, for example, using a technique referred to herein as "histogram compression." In histogram compression, embodiments of the invention generate a 32,768-element histogram from all of the pixels of the source image and determine pixel values present in the image. The histogram is then "packed", or reduced in size, to eliminate as many empty spaces as possible and a map is constructed that allows for reversing the packing procedure in later stages. The packed image usually has a much smaller range than the original, typically, about 10,000 values instead of 32,768, allowing for usage of correspondingly more compact Assimilators. The operations involved in the ongoing image processing are not affected by the packing of the histograms. For example, the operation of the median filter may be applied to the packed image data, then unpacked using the map constructed during the packing stage. This technique can result in a significant increase in speed and memory efficiency.

Embodiment of a High-Quality Median Filter

In the following discussion, several methods provided by the invention are combined to give an example of an improved median filter in an embodiment of the invention. In the description provided above, the basic technique for a median filter allows processing image data using a fairly large filter radius "r". However, the basic technique has the disadvantage that it is "anisotropic", or not necessarily symmetric in all directions.

Figure 7:
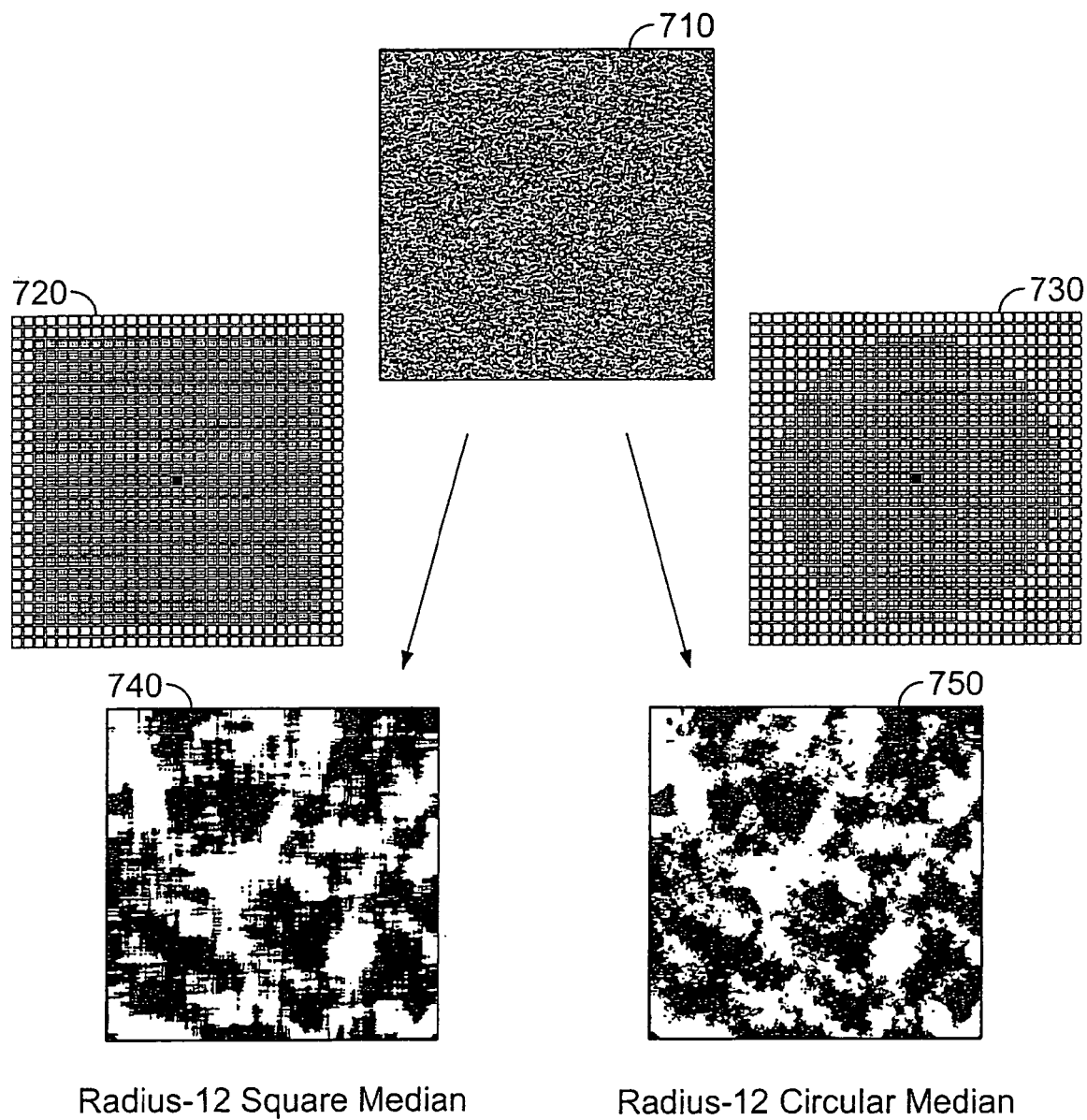
FIG. 7 shows a block diagram illustrating filtering an image using one of two median filters: one based on a square-shaped filter and the other based on a circle-shaped filter, in embodiments of the invention.

FIG. 7 shows a block diagram illustrating filtering an image using one of two median filters: on based on a square-shaped filter and the other based on a circle-shaped filter, in embodiments of the invention. Image area 710 is an image generated though random generation of pixels. Image 710 may be processed through a square-shaped filter 720 to produce filtered area 740, or it may be processed through circle-shaped filter 730 to produce filtered area 750. In an embodiment of the invention, the square-shaped filter may produce streaky artifacts into the filtered image 740. If a circular region 730, surrounding each pixel, is used for the median calculation, the artifacts disappear. The implementation of the circular filter, in embodiments of the invention, may involve only a minor modification to the basic square median algorithm. From symmetry, it can be shown that a circular region of any size must contain an odd number of pixels. When each pixel is matched with its twin directly opposite, the center pixel remains as the only unmatched pixel. This fact allows us to calculate an exact median value for any size circular region.

Overlapping Regions

Figure 8:
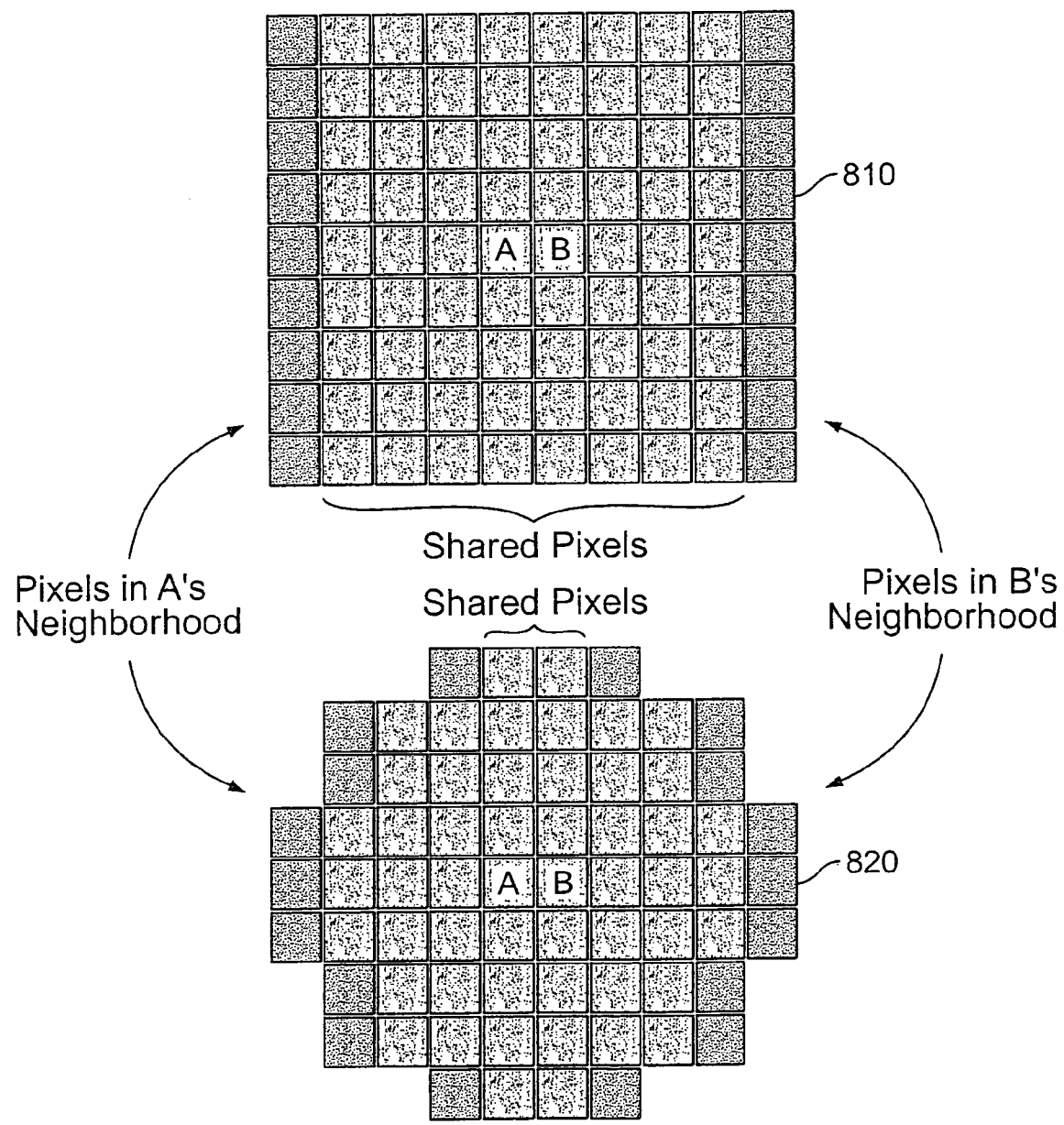
FIG. 8 is a block diagram illustrating the implementation of overlapping regions of the circular filter vs. square filter in an embodiment of the invention.

FIG. 8 is a block diagram illustrating the implementation of overlapping regions of the circular filter and the square filter in an embodiment of the invention. In this example, a radius of 4 pixels is considered. The non-overlapping regions, represented by gray pixels, on the edges of square filter 810 shift inward in a circular filter 820 to accommodate the circular shape. However, the number of pixels in the two overlapping areas are similar. A circular median filter may be obtained through the modification of the square filter by pre-computing the insets for the border pixels. In addition, since the circular region is symmetric along both axes, the same inset values can be used to advance the steps in calculations for regions both horizontally and vertically.

Variable-Radius Filter

The circular filter possesses a property that makes it better suited for filtering than the square filter. The square median filter requires an integer spanning distance, so its effect changes in quantized jumps as the radius changes. By contrast, the circular median changes smoothly as the radius increases, since it is not quantized to the horizontal and vertical axes. This opens up the possibility of filtering an image with a variable-radius effect.

Figure 9:
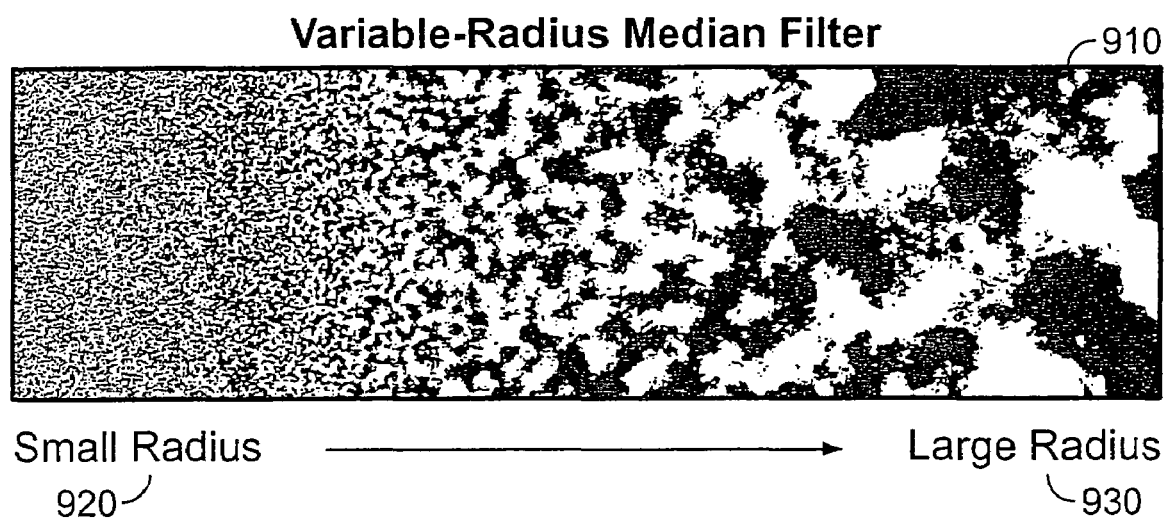
FIG. 9 illustrates image filtering using a circular filter having a variable radius in accordance with an embodiment of the invention.

FIG. 9 illustrates image filtering using a circular filter having a variable radius in accordance to an embodiment of the invention. The filtered image 910 is the result of filtering a randomly generated image (not shown) similar to 710, using a circular median filter, while progressively varying the radius of the filter from small, as shown by 920, to big, as shown by 930. The computational cost of the variable radius filter is almost the same as the fixed-radius version, except that the overlapping circular regions surrounding adjacent pixels differ slightly in size. Finding which pixels to add and subtract at each step is still straightforward to calculate and, in practice, the variable-radius median often runs faster than the fixed-radius equivalent, since small-radius areas are fundamentally more efficient to compute.

Embodiments of the invention may vary the radius by pre-computing the insets for each possible radius, leading to a straightforward way of simultaneously shifting the region of interest one pixel and varying its radius, by calculating the appropriate pixels to add and remove per scanline. In practice, the median radius is typically modulated by an 8-bit mask image, leading to 256 possible radius values, usually from zero to some "maximum radius" value.

Other Embodiments of the Median Filter

Once the median filter is implemented, its functionality can be extended in a variety of useful ways. A few ways are discussed below.

Rank-Order Filtering

The basic median filter architecture defines the $50^{th}$ percentile as the output value. In embodiments of the invention, the output value can be changed to different values. For example, choosing the $100^{th}$ percentile will yield a "maximum" filter where the filter finds the brightest pixel within the surrounding region for every location. This flexibility yields a wide range of useful effects.

Center-Weighting

In embodiments of the invention, once the Assimilators are computed for a given location, the method provided by the invention is able to add the central pixel to the corresponding Assimilator with an arbitrary coefficient before extracting the median. The value is then removed, restoring the Assimilator. Center weighting has the effect of emphasizing the importance of the center pixel with respect to its neighbors and tends to preserve edges and shapes better than the non-weighted basic median. This weighting can be performed in combination with rank-order filtering, yielding another dimension of useful effects.

The usefulness of center weighting is illustrated by the fact that when a square corner is median-filtered, the corner rounds off. The rounding off is more prominent as the median radius is increased. But, if the center pixel is weighted at 50% of the area of the median-filtered region, the corner remains intact regardless of the median radius. For example, for a radius-5 median, there are 121 pixels to be considered; the center pixel plus 120 surrounding pixels. If the center pixel is given a weight of 60 (instead of 1), then a square corner will remain unchanged after filtering with any radius size.

Sharpening, Softening, Texture Extraction and Scratch Removal

In embodiments of the invention, sharpening, softening, texture extraction and scratch removal effects can be obtained by post-processing the median-filtered image in combination with the original. Comparing the original image to the median-filtered image and extrapolating away from the median to increase the sharpness, for instance, can do sharpening. If a given pixel has, for example, a value 100 in the original image and 150 in the median-filtered image, an embodiment of the invention extrapolates 100% backwards to the value 50. Applied to each pixel, this process has the overall effect of sharpening the image.

In an embodiment of the invention, a thresholding value can be applied to the image data, which has the effect of adjusting the results a given distance back toward the original value. This can reduce the sharpness effect in a pleasing way.

Softening is achieved by taking median-filtered pixels that differ slightly from the original and adjusting them to be even closer to the original, based on an arbitrarily defined curve. This has the effect of preserving large-scale features, while smoothing out subtle textures.

Multiple Median

Unlike linear filters, such as a Gaussian blur, the nonlinear Median filter gives distinctly different results when it is applied multiple times to an image, in accordance to embodiments of the invention. Multiple applications of the median filter have a tendency to create a much smoother result than single application, in a way that cannot be duplicated by a single application of the median filter with, for example, a larger radius.

Bounded Median

In many cases, an image has a small amount of noise (e.g., film grain) that affects the image uniformly. When a median filter is applied to remove such noise, it may be desirable to consider only those neighboring pixels that are within a certain brightness threshold (say, 10 levels out of 255) of the center pixel. The Multi-Resolution Histogram structure, provided by the invention, allows for straightforward determination of any value's percentile rank with respect to all other elements in the histogram. In embodiments of the invention, for a central pixel with, for example, a value 100, the method calculates the percentile for values 90 and 110, takes their average, and extracts this average percentile to compute the final result. For an arbitrarily large bounding range, this converges to the straightforward median filter. For arbitrarily small bounding ranges, it has a correspondingly reduced effect on the original image. Intermediate values provide excellent results for removal of uniform noise or film grain, especially with multiple applications of the filter.

Oversampled Median

The nonlinear properties of the Median filter sometimes have the unintended consequence of creating discontinuities in the filtered image. Embodiments of the invention can reduce the discontinuities problem by oversampling the median extraction. For example, in embodiments of the invention, one could extract the $45^{th}$, $50^{th}$, and $55^{th}$ percentiles, or any number of arbitrarily selected percentile values, instead of extracting just the $50^{th}$ percentile to find the median and combine them to create a smoother result.

Elliptical Median

Embodiments of the invention implement other shapes than circular or square. For example, an embodiment of the invention may implement a filter that may be elliptical, or take on any shape which is continuous when intersected with horizontal or vertical scan lines. This allows the use of shapes such as boxes, ovals, diamonds, and axis-aligned crosses.

Figure 10:
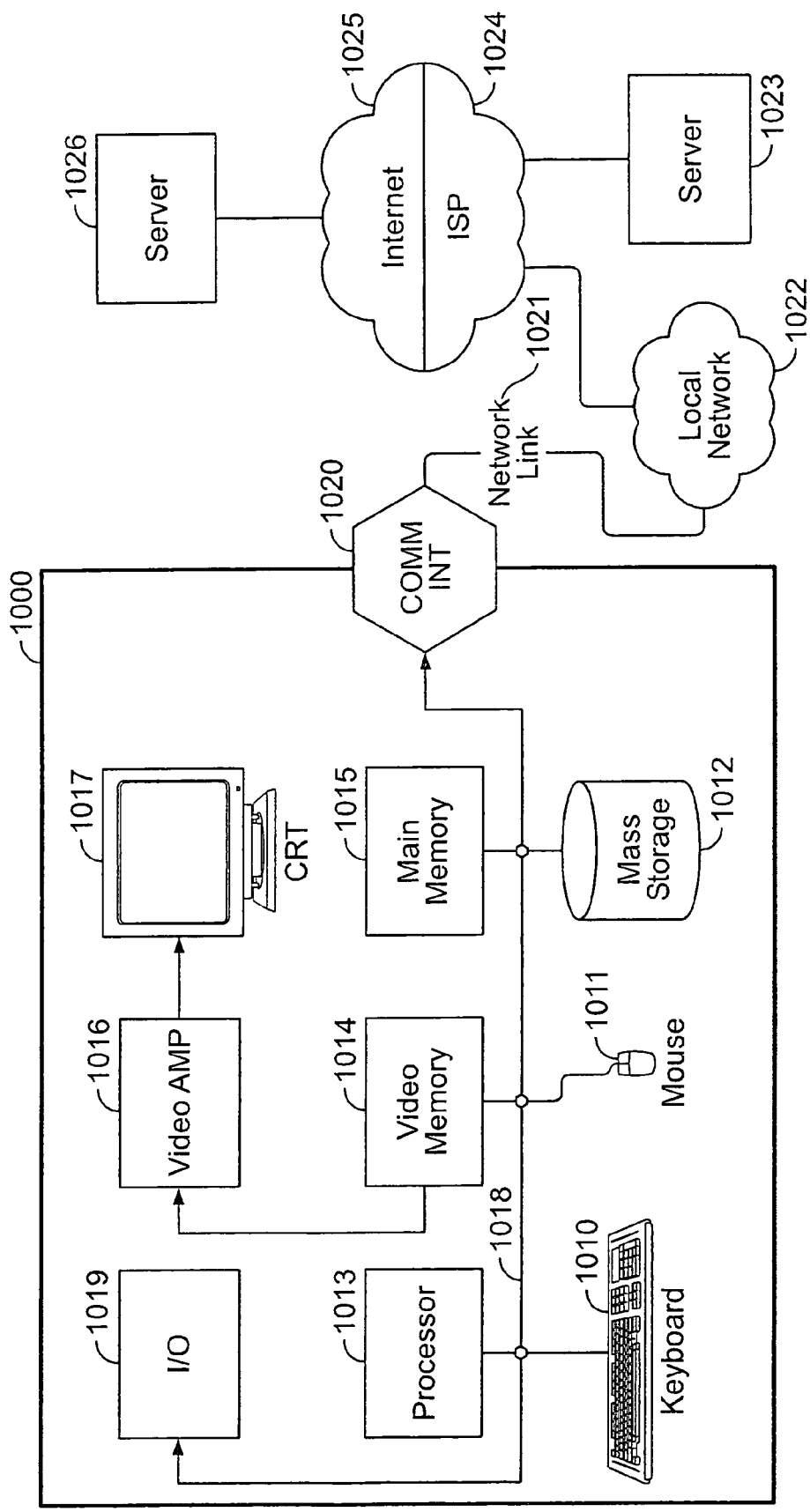
FIG. 10 illustrates a general-purpose hardware environment used in accordance with one embodiment of the invention.

Embodiment of General Purpose Computer Environment:

An embodiment of the invention can be implemented as computer software in the form of computer readable program code executed on one or more general-purpose computers, such as the computer 1000, illustrated in FIG. 10. A keyboard 1010 and mouse 1011 are coupled to a bi-directional system bus 1018 (e.g., PCI, ISA or other similar architecture). The keyboard and mouse are for introducing user input to the computer system and communicating that user input to central processing unit (CPU) 1013. Other suitable input devices may be used in addition to, or in place of, the mouse 1011 and keyboard 1010. I/O (input/output) unit 1019 coupled to bi-directional system bus 1018 represents possible output devices such as a printer or an A/V (audio/video) device.

Computer 1000 includes video memory 1014, main memory 1015, mass storage 1012, and communication interface 1020. All these devices are coupled to a bidirectional system bus 1018 along with keyboard 1010, mouse 1011 and CPU 1013. The mass storage 1012 may include both fixed and removable media, such as magnetic, optical or magnetic optical storage systems or any other available mass storage technology. The system bus 1018 provides a means for addressing video memory 1014 or main memory 1015. The system bus 1018 also provides a mechanism for the CPU to transfer data between and among the components, such as main memory 1015, video memory 1014 and mass storage 1012.

In one embodiment of the invention, the CPU 1013 is a microprocessor manufactured by Motorola, such as the 680X0 processor, an Intel Pentium class processor, or an UltraSparc class processor from Sun Microsystems. However, any other suitable processor or computer may be utilized. Video memory 1014 is a dual ported video random access memory. One port of the video memory 1014 is coupled to video accelerator 1016. The video accelerator device 1016 is used to drive a CRT (cathode ray tube), and LCD (Liquid Crystal Display), or TFT (Thin-Film Transistor) monitor 1017. The video accelerator 1016 is well known in the art and may be implemented by any suitable apparatus. This circuitry converts pixel data stored in video memory 1014 to a signal suitable for use by monitor 1017. The monitor 1017 is a type of monitor suitable for displaying graphic images.

The computer 1000 may also include a communication interface 1020 coupled to the system bus 1018. The communication interface 1020 provides a two-way data communication coupling via a network link 1021 to a network 1022. For example, if the communication interface 1020 is a modem, the communication interface 1020 provides a data communication connection to a corresponding type of telephone line, which comprises part of a network link 1021. If the communication interface 1020 is a Network Interface Card (NIC), communication interface 1020 provides a data communication connection via a network link 1021 to a compatible network. Physical network links can include Ethernet, wireless, fiber optic, and cable television type links. In any such implementation, communication interface 1020 sends and receives electrical, electromagnetic or optical signals that carry digital data streams representing various types of information.

The network link 1021 typically provides data communication through one or more networks to other data devices. For example, network link 1021 may provide a connection through local network 1022 to a host computer 1023 or to data equipment operated by an Internet Service Provider (ISP) 1024. ISP 1024 in turn provides data communication services through the worldwide packet data communication network now commonly referred to as the "Internet" 1025. Local network 1022 and Internet 1025 both use electrical, electromagnetic or optical signals that carry digital data streams to files. The signals through the various networks and the signals on network link 1021 and through communication interface 1020, which carry the digital data to and from computer 1000, are exemplary forms of carrier waves for transporting the digital information.

The computer 1000 can send messages and receive data, including program code, through the network(s), network link 1021, and communication interface 1020. In the Internet example, server 1026 might transmit a requested code for an application program through Internet 1025, ISP 1024, local network 1022 and communication interface 1020.

In one embodiment of the invention a thin-client device is configured to interface with the computer system described above via a computer network. In other instances (e.g., when a smart mobile device is utilized) some or all of the components discussed above are incorporated into the device. It will be evident to one of ordinary skill in the art that the computer systems described above are for purposes of example only. An embodiment of the invention may be implemented in any type of computer system or programming or processing environment.

Thus, a method and apparatus for an improved median filter has been described. Particular embodiments described herein are illustrative only and should not limit the present invention thereby.

What is claimed is:

1. A method for modifying a digital image by applying a median filter using a computer system comprising a central processor and memory comprising:
    allocating memory locations in said memory for a set of histograms;
    loading a first image data set into said memory locations for said set of histograms;
    computing a first plurality of median values of said first image data set from said data in said memory locations for said set of histograms;
    partially updating said memory locations for said set of histograms with a second image data set; and,
    computing a second plurality of median values of said second image data set from said updated data in said memory locations for said set of histograms.

2. The method of claim 1, wherein said allocating said memory locations for said histogram further comprises allocating memory locations for a plurality of histogram hierarchies.

3. The method of claim 2, wherein said plurality of histogram hierarchies further comprise each one of said plurality of histogram hierarchies having at least one memory array.

4. The method of claim 3, wherein said at least one memory array further comprises associating said memory array with a histogram's numerical resolution.

5. The method of claim 1, wherein said allocating said memory locations for said set of histograms further comprises aligning at least two memory arrays associated with said set of histograms.

6. The method of claim 1, wherein said first image data set further comprises a set of multiple color channels of an image area.

7. The method of claim 1, wherein said loading said first image data set further comprises applying at least one statistical process to said image data set.

8. The method of claim 7, wherein said at least one statistical process further comprises computing a frequency for each value in said first image data set.

9. The method of claim 1, wherein said loading further comprises incrementing at least one of said memory locations allocated to said set of histograms.

10. The method of claim 1, wherein said computing said first plurality of median values further comprises finding a percentile value exceeding a threshold for selecting each one said median values.

11. The method of claim 1, wherein said computing said second plurality of median values further comprises finding a percentile value exceeding a threshold for selecting said each one of said median values.

* * * * *